United States Patent [19]

Mylander

[11] Patent Number: 4,530,426

[45] Date of Patent: Jul. 23, 1985

[54] PARK LOCK AND TRANSMISSION INTERLOCK

[75] Inventor: Richard H. Mylander, Glen Ellyn, Ill.

[73] Assignee: J. I. Case Company, Racine, Wis.

[21] Appl. No.: 446,919

[22] Filed: Dec. 6, 1982

[51] Int. Cl.³ .............................................. B60K 41/26
[52] U.S. Cl. .................................. 192/4 A; 192/3.63; 74/483 R
[58] Field of Search ............................. 192/4 A, 3.63; 74/483 R, 483 K, 878, 477

[56] References Cited

U.S. PATENT DOCUMENTS

| | | | |
|---|---|---|---|
| 2,716,474 | 8/1955 | Parish | 74/483 R |
| 3,710,904 | 1/1973 | Boyer et al. | 192/4 A |
| 3,987,879 | 10/1976 | Longshore et al. | 192/4 A |
| 4,069,900 | 1/1978 | Stamate | 192/4 A |
| 4,421,215 | 12/1983 | Bellah et al. | 74/483 K |

Primary Examiner—George H. Krizmanich
Attorney, Agent, or Firm—Dressler, Goldsmith, Shore, Sutker & Milnamow, Ltd.

[57] ABSTRACT

A park lock interlock assembly prevents shifting of a vehicle transmission, while a vehicle park lock is engaged, by virtue of an interlock rod block insertion into an interlock rod aperture, when the transmission is in a neutral position.

6 Claims, 2 Drawing Figures

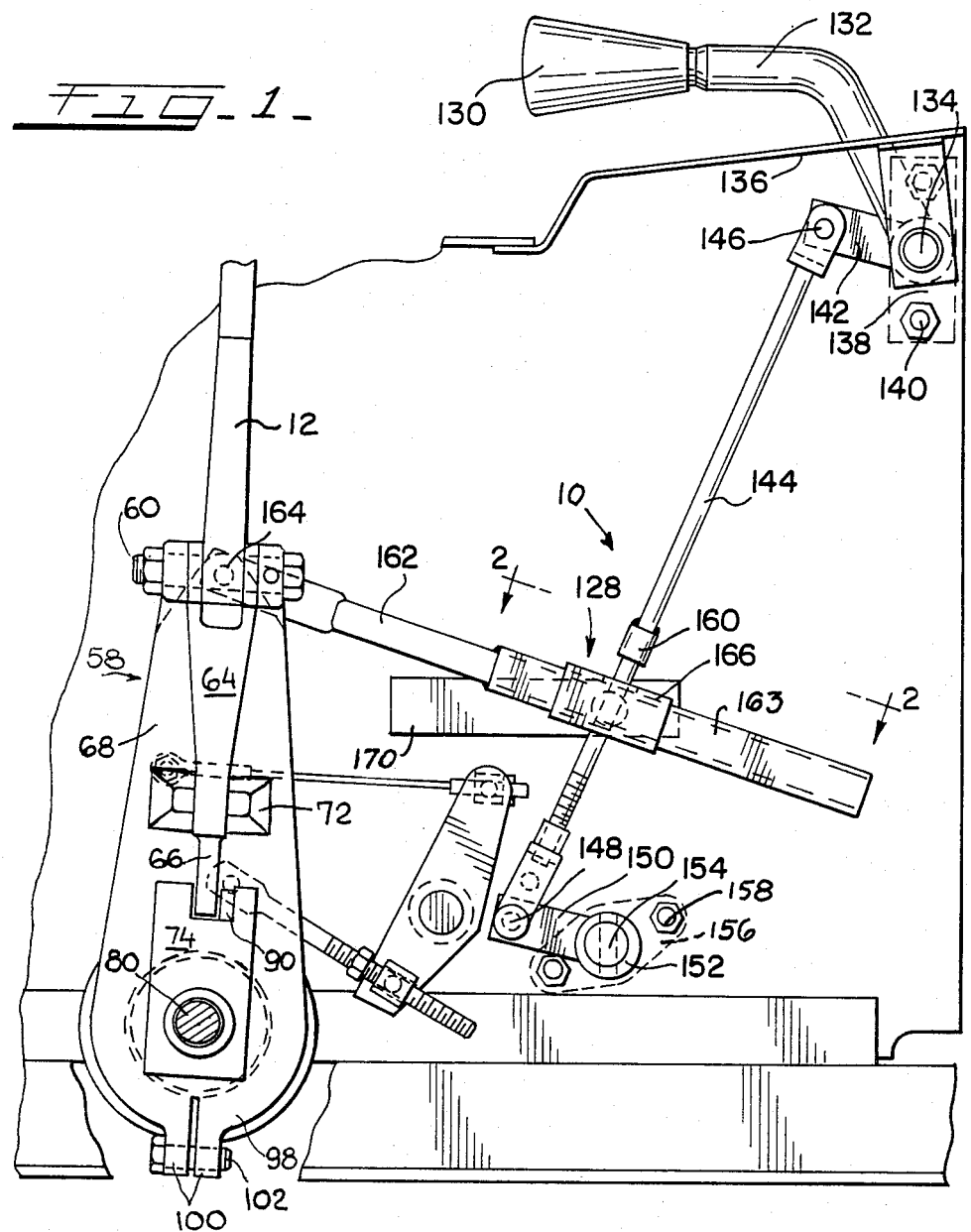
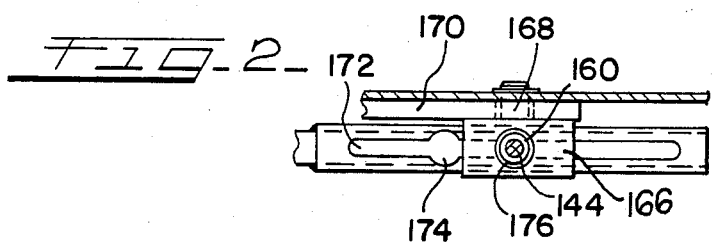

PARK LOCK AND TRANSMISSION INTERLOCK

BACKGROUND OF THE INVENTION

1. Field of the Invention

This invention pertains to park lock interlock systems and more particularly to a tractor interlock system preventing the range transmission shifting in gear when the park lock is engaged.

2. Description of the Prior Art

Various park lock interlock systems which have been heretofore disclosed are exemplified in the following patents. For instance, the U.S. Pat. No. 3,987,879, issued to Longshore et al., discloses a vehicle park lock mechanism on a multiple shift transmission with the park lock and reverse operated on the same shift rail.

Another U.S. Pat. 4,069,900, issued to Stamate, discloses a combination transmission neutralizer and power train interlock system including a mechanism which is actuatable to engage an interlock with the power train to positively prevent movement of the vehicle.

However, none of the patent references of record discloses such a novel park lock interlock system as specified and described in the subject invention.

SUMMARY OF THE INVENTION

According to the present invention, in a motor vehicle cab a park lock and transmission interlock assembly is mounted on a vehicle console. The park lock interlock assembly comprises a handle mechanism pivotally secured to the vehicle cab console and connected with a lock rod. The lock rod has its first end connected with the handle mechanism and its second end pivotally attached to the vehicle cab console. An interlock rod is supported by and moveable through a mount means and pivotally secured to a vehicle transmission shift lever for conjoint movement therewith. The interlock rod has a slot with an enlarged aperture disposed at a predetermined location within this slot. A mount means has an opening alignable with said enlarged aperature. The lock rod projects through the opening and slot. The interlock rod moves across the lock rod within its slot parameters during all transmission shift lever engagements. An interlock stop is rigidly connected to the lock rod and slideable into the aligned aperture and opening only when the transmission shift lever is placed in a neutral position. This prevents shifting of the interlock rod and transmission shift lever while a vehicle park lock is engaged.

BRIEF DESCRIPTION OF THE DRAWINGS

FIG. 1 is an elevational fragmentary side view of the park lock and transmission control assembly;

FIG. 2 is a fragmentary cross-section view taken substantially along the lines 2—2 in FIG. 1.

BRIEF DESCRIPTION OF THE PREFERRED EMBODIMENT

The invention may be carried into practice in a number of ways. But one specific embodiments of a park lock interlock for a motor vehicle such as an agricultural tractor will be described by way of example only.

Referring now to the drawings wherein reference characters designate like or corresponding parts throughout the several views, there is shown in FIG. 1 a park lock interlock and transmission control assembly 10. The interlock system 10 prevents inadvertent shifting of the transmission gear shift or handle lever 12 out of the neutral position until the interlock mechanism 10 is released and the park lock immobilizing the tractor drive train is disengaged. The interlock assembly 10 described hereinbelow can be applied to a range and speed transmission selection system such as disclosed in the concomitant and co-assigned applications Ser. No. 446,920 and Ser. No. 446,921, filed on Dec. 6, 1982, or the like. As specified in this application, the bell crank lever 58 is rotatably supported by a shoulder bolt 60. The bell crank lever 58 includes a long arm 64 with a tip portion 66. The 2-prong buttress fork 72 partially encompases and absorbs the pressure applied to the long arm 64 moveable therewithin. This pressure is applied to the bell crank lever 58 when the handle lever 12 engages the range transmission gears by rotating gear selector plate 74, and so on. The first range plate 74 is unitary with the shaft 80. The engagement of the range pads is accomplished by virtue of reactive abutment of the tip 66 of the long arm 64 with a contact pad 90 on the range plate 74, etc. The mount bracket 68 comprises at its lower portion a friction clamp 98 providing secure positioning of the bracket. The friction clamp 98 has downwardly extending lips 100 interconnected by a shoulder bolt 102.

Although the actual interlock device 128 carries out the locking action, the interlock system includes the following elements. The knob 130 is mounted on the handle 132, which in turn is pivotally joined at 134 to a console body 136. The bracket 138 supporting the pivot pin joint 134 is attached to a console body 136 by a bolt 140. The dead lever 142 is rigidly connected with the handle 132 and pivotally connected to the lock rod 144 by an upper pivot joint 146. The lock rod 144 is also connected at its lower end by a lower pivot joint 148 to a support arm 150. The bushing 152 unitary with the arm 150 rotates on a stud 154 projecting from the mount flange 156 which is secured to the console 136 by bolts 158.

The interlock device 128 includes a lock cylinder 160 welded to the lock rod 144, thereby significantly increasing the periphery of the rod 144 at a particular location. The interlock rod 162 has a square tubing 163 at its one end. The second end of the rod 162 is pivotally joined at 164 with the handle lever 12. The support block 166 having a parallelepiped configuration pivots on a holding peg 168 extending outwardly from the mount plate 170 and supports the tubing end 163 sliding therethrough. The square tubing 163 comprises an elongated slot 172 with an enlarged aperture 174 disposed at a predetermined location corresponding to the lever 12 placement on the neutral position. A lock rod 144 can slide through the bore 176, intersecting the slot 172 in the support block 166, but the block 160 restricts any further downward movement, except when the aperture 174 and bore 176 are in registry. The bore 176 is essentially equally sized with the aperture 174 and aligned therewith in the lever 12 neutral position.

In operation, the handle 12 pulls or pushes the interconnecting rod 162 during its range gear engagement opeations. The lock rod 144 is stationary and freely slideable within the slot 172 during all of the range gear engagements. When the handle lever 12 is placed in the neutral position, the handle 132 can be moved downwardly, thereby forcing the lock rod 144 to move through the bore or opening 176 of the support block 166. In this position the bore 176 is aligned with the enlarged aperture 174 in the slot 172 thereby permitting the ledge-like lock cylinder 160 to slide therethrough. In this position the interlock rod 162 is immobilized by the cylinder 160 sitting in the tube aperture 174. Since the aperture 174 and the bore 176 can be aligned only in the neutral position, the park lock can be engaged only when the range shift lever 12 is in neutral. The lock cylinder 160 arrests the lock rod 144 displacement through the tube 163, except through the aperture 174.

Modern agricultural tractors must have a transmission lock which is used when the tractor is stopped. The range transmission shift lever must not be free to complete or even start to shift while the park lock is engaged. The subject park lock interlock facilitates safety of the tractor operator and preservation of both the park lock mechanism and the range transmission gears. With the park lock engaged and the interlock stop block with a lock cylinder holding the sliding interlock rod in the neutral position, the transmission shift handle lever 12 is prevented from being moved whether by choice or accident. Moreover, any attempt to engage the park lock while the shift lever is in any position, other than neutral, will result in the lock cylinder hitting the narrow slot rather than the large aperture. Thus, any engagement of the range transmission is prevented.

The foregoing description and drawings merely illustrate the preferred embodiment and the invention is not limited thereto, except insofar as the appended claims are so limited, and so those skilled in the art who have the disclosure before them will be able to make modifications and variations therein without departing from the scope of the invention.

What is claimed is:

1. In a motor vehicle cab a park lock and transmission interlock assembly mounted on a vehicle console and comprising:

a handle mechanism pivotally secured to said vehicle cab console and connected with a lock rod;
   said lock rod having its first end connected to said handle mechanism and its second end pivotally attached to said vehicle cab console;
   an interlock rod supported by and moveable through a mount means and pivotally secured to a vehicle transmission shift lever for conjoint movement therewith;
   said vehicle shift lever selectively engaging gears in said transmission;
   said interlock rod having a slot with an enlarged aperture disposed at a predetermined location within said slot;
   said mount means having an opening alignable with said enlarged aperture;
   said lock rod projecting through said slot and said opening and moveable essentially transversely to said interlock rod;
   said interlock rod moving across said lock rod within said slot parameters during all transmission shift lever engagements;
   an interlock stop rigidly secured to said lock rod and nonrotatably slideable into said aligned aperture and opening only when said transmission shift lever being placed in a neutral position;
   said stop being positioned within said mount means and said aperture for blocking displacement of said interlock rod and said shift lever.

2. The invention according to claim 1 and
   said mount means comprising a support block rotatably fixed to said vehicle cab console and said lock rod being slideably displaceable through said opening in said support block for a lockable engagement with said interlock rod.

3. The invention according to claim 1, and
   said handle mechanism comprising a handle rigidly attached to a dead lever;
   said dead lever pivotally secured to said vehicle cab console and interconnecting said handle with said lock rod.

4. The invention according to claim 1, and
   said interlock rod including a tubular portion and said slot being disposed in said tubular portion; and
   said mount means opening intersecting said slot.

5. The invention according to claim 1, and
   said interlock stop comprising a ledge element integrated with said lock rod;
   said ledge element arresting said lock rod displacement through said slot except through said enlarged aperture.

6. In a motor vehicle cab a park lock and transmission interlock assembly mounted on a vehicle console and comprising:

a handle mechanism pivotally secured to said vehicle cab console and connected with a lock rod;
   said lock rod having its first end connected to said handle mechanism and its second end pivotally attached to said vehicle cab console;
   an interlock rod supported by and moveable through a mount means mounted on said console and pivotally secured to a vehicle transmission shift lever for conjoint movement therewith;
   said shift lever selectively engaging transmission gears;
   said interlock rod having a slot with an enlarged aperture disposed at a predetermined location within said slot;
   said mount means comprising a rotatable block having an opening alignable with said enlarged aperture;
   said interlock rod being able move across said lock rod within the slot parameters during all transmission shift lever engagements;
   an interlock stop rigidly secured to said lock rod and nonrotatably slideable into said aperture and opening being aligned with each other only when said transmission shift lever being placed in a neutral position;
   said interlock rod including a tubular portion and said slot being disposed in said tubular portion;
   said interlock stop comprising a ledge element integrated with said lock rod;
   said ledge element arresting said lock rod displacement through said slot except through said enlarged aperture.

* * * * *